United States Patent
Shih et al.

(10) Patent No.: US 11,818,503 B2
(45) Date of Patent: Nov. 14, 2023

(54) CONFERENCE SYSTEM AND TRANSMITTER WITH LOW STANDBY POWER CONSUMPTION AND NO BOOTING DELAY TIME

(71) Applicant: BENQ CORPORATION, Taipei (TW)

(72) Inventors: Chia-Nan Shih, Taipei (TW); Chen-Chi Wu, Taipei (TW); Chin-Fu Chiang, Taipei (TW); Chuang-Wei Wu, Taipei (TW); Jung-Kun Tseng, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/835,933

(22) Filed: Jun. 8, 2022

(65) Prior Publication Data
US 2023/0045628 A1 Feb. 9, 2023

(30) Foreign Application Priority Data

Aug. 3, 2021 (TW) .................................. 110128473

(51) Int. Cl.
*H04N 7/15* (2006.01)
*G06F 1/26* (2006.01)
*H04N 7/14* (2006.01)

(52) U.S. Cl.
CPC .............. *H04N 7/15* (2013.01); *G06F 1/263* (2013.01); *H04N 7/147* (2013.01)

(58) Field of Classification Search
CPC ........... H04N 7/15; H04N 7/147; G06F 1/263

USPC ......................................................... 709/204
See application file for complete search history.

(56) References Cited

U.S. PATENT DOCUMENTS

| | | | |
|---|---|---|---|
| 8,417,962 B2 * | 4/2013 | Novak ................... | G06F 21/575 713/188 |
| 9,736,139 B2 * | 8/2017 | Melton ............... | G06F 21/6245 |
| 9,942,515 B2 * | 4/2018 | Krantz .................. | H04M 9/082 |
| 10,218,754 B2 * | 2/2019 | High ....................... | H04L 67/60 |
| 10,298,883 B2 * | 5/2019 | Shiro ...................... | H04L 67/14 |
| 10,956,169 B2 * | 3/2021 | Marathe ................ | G06F 9/4405 |
| 10,985,617 B1 * | 4/2021 | Johnston ................. | H02J 50/90 |

(Continued)

FOREIGN PATENT DOCUMENTS

| | | |
|---|---|---|
| CN | 102053463 A | 5/2011 |
| CN | 209118258 U | 7/2019 |

(Continued)

*Primary Examiner* — Tauqir Hussain

(57) ABSTRACT

A conference system with low standby power consumption includes a transmitter, an image data source, a receiver, and a display device. The transmitter includes a battery for providing power, at least one link port for accessing data, and a processor coupled to the battery and the at least one link port. The image data source is used for transmitting the image data to the transmitter. The receiver is linked to the transmitter for receiving the image data. The display device is linked to the receiver for displaying the image data. When the transmitter and the image data source are electrically coupled, the processor ceases to use the battery of the transmitter and controls the image data source for providing power to the transmitter. When the transmitter and the image data source are separated, the processor uses the battery of the transmitter for driving firmware of the transmitter.

13 Claims, 5 Drawing Sheets

(56) References Cited

U.S. PATENT DOCUMENTS

| | | | |
|---|---|---|---|
| 2006/0064525 A1* | 3/2006 | Ahluwalia | G06F 13/387 |
| | | | 710/72 |
| 2008/0205519 A1* | 8/2008 | Goodart | G06F 3/14 |
| | | | 375/E7.123 |
| 2011/0113272 A1* | 5/2011 | Tsai | G03B 21/00 |
| | | | 713/340 |
| 2012/0102239 A1* | 4/2012 | Huang | H04L 69/08 |
| | | | 710/14 |
| 2013/0191891 A1* | 7/2013 | Adderly | H04L 63/10 |
| | | | 726/5 |
| 2013/0191896 A1* | 7/2013 | Adderly | H04W 4/80 |
| | | | 709/204 |
| 2015/0261277 A1* | 9/2015 | Park | G06F 3/1229 |
| | | | 713/323 |
| 2018/0255384 A1* | 9/2018 | Phillips | H04Q 9/00 |
| 2018/0326130 A1* | 11/2018 | Thompson | A61M 1/06 |
| 2019/0197983 A1* | 6/2019 | Ota | G06F 3/147 |
| 2021/0089108 A1* | 3/2021 | Iyer | G06F 1/28 |
| 2022/0116237 A1* | 4/2022 | Pang | G06F 13/4282 |
| 2023/0209405 A1* | 6/2023 | Krishnamurthy | H04W 72/23 |
| | | | 370/329 |

FOREIGN PATENT DOCUMENTS

| | | |
|---|---|---|
| CN | 111641431 A | 9/2020 |
| TW | I718632 B | 2/2021 |

* cited by examiner

CONFERENCE SYSTEM AND TRANSMITTER WITH LOW STANDBY POWER CONSUMPTION AND NO BOOTING DELAY TIME

BACKGROUND OF THE INVENTION

1. Field of the Invention

The present invention relates to a conference system and a transmitter, and more particularly, a conference system and a transmitter with low standby power consumption and no booting delay time.

2. Description of the Prior Art

With the rapid development of science and technology, various projector systems and conference reporting systems have been adopted in our daily life. The conference reporting system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operation efficiency.

Therefore, the transmitter can be regarded as a node for relaying data from the computer to a screen or a display. In other words, when a user wants to use another computer for projecting different projection contents, the transmitter needs to be unplugged from one computer, and then plugged into another computer. However, after the transmitter is unplugged from one computer, since the computer no longer supplies power to the transmitter, an operating system (OS) of the transmitter may be forcedly terminated. After the transmitter is plugged into another computer, although another computer can provide power to the transmitter, it takes a lot of time for rebooting the operating system of the transmitter. In other words, when the transmitter is switched and coupled to different computers, an operation delay of re-booting the operating system is introduced, thereby leading to a reduction of operating experience.

SUMMARY OF THE INVENTION

In an embodiment of the present invention, a conference system with low standby power consumption is disclosed. The conference system comprises a transmitter, an image data source, a receiver, and a display device. The transmitter comprises a battery configured to provide power, at least one link port configured to access data, and a processor coupled to the battery and the at least one link port. The image data source is configured to transmit image data to the transmitter. The receiver is linked to the transmitter and configured to receive the image data. The display device is linked to the receiver and configured to display the image data. The processor detects a link state between the image data source and the transmitter through the at least one link port. When the transmitter and the image data source are electrically coupled, the processor ceases to use the battery of the transmitter and controls the image data source for providing power to the transmitter. When the transmitter and the image data source are separated, the processor uses the battery of the transmitter for driving firmware of the transmitter. The link state comprises a power channel link state or a media transmitted data channel link state. After the image data source establishes a link to the transmitter through the at least one link port, the image data is transmitted from the image data source to the receiver through the transmitter. The receiver controls the display device for displaying the image data.

In another embodiment of the present invention, a transmitter with low standby power consumption is disclosed. The transmitter comprises a battery configured to provide power, at least one link port configured to access data between the image data source and the transmitter, and a processor coupled to the battery and the at least one link port. The processor detects a link state between the image data source and the transmitter through the at least one link port. When the transmitter and the image data source are electrically coupled, the processor ceases to use the battery of the transmitter and controls the image data source for providing power to the transmitter. When the transmitter and the image data source are separated, the processor uses the battery of the transmitter for driving firmware of the transmitter. The link state comprises a power channel link state or a media transmitted data channel link state. After the image data source establishes a link to the transmitter through the at least one link port, the image data is transmitted from the image data source to the receiver through the transmitter. The receiver controls the display device for displaying the image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
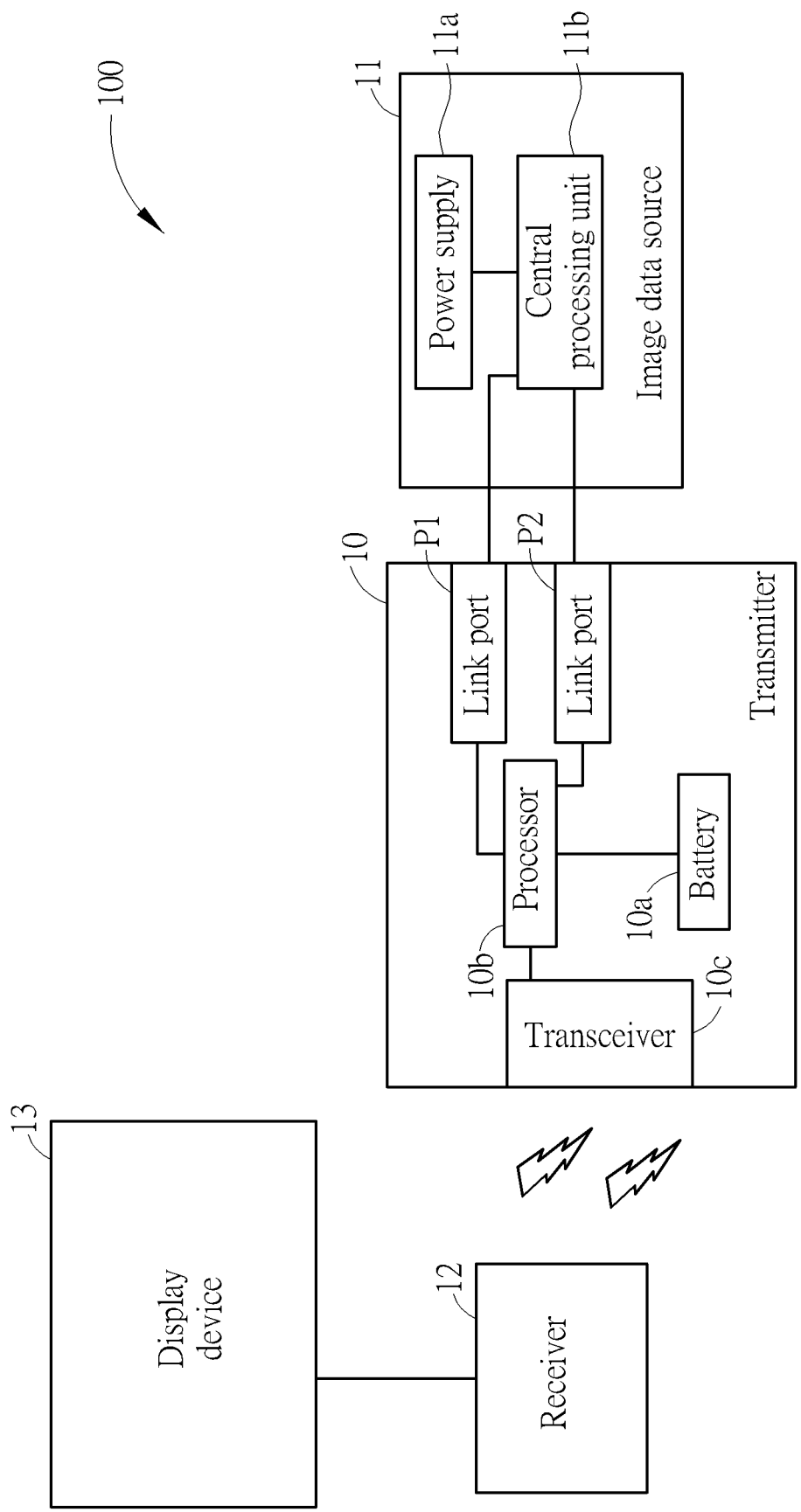
FIG. 1 is a block diagram of a conference system with low standby power consumption according to an embodiment of the present invention.

FIG. 1 is a block diagram of a conference system 100 with low standby power consumption according to an embodiment of the present invention. For simplicity, the conference system 100 with low standby power consumption is called as a conference system 100 hereafter. The conference system 100 includes a transmitter 10, an image data source 11, a receiver 12, and a display device 13. The transmitter 10 includes a battery 10a for providing power, at least one link port (i.e., such as link ports P1 and P2) for accessing data, and a processor 10b coupled to the battery 10a and the at least one link port P1 and P2. In the transmitter 10, the battery 10a can be any electrical energy storage device, such as a capacitor, a rechargeable battery, or a lithium battery. The link port P1 can be a High Definition Multimedia Interface (HDMI) port for accessing image data. The link port P2 can be a Universal Serial Bus (USB) port for transmitting power and controlling signals. The processor 10b can be any form of processor, such as a scalar. The transmitter 10 can also include a transceiver 10c. The transceiver 10c can be a wireless transceiver, such as a Bluetooth transceiver or a wireless fidelity (Wi-Fi) transceiver. The image data source 11 is used for transmitting image data to the transmitter 10. The image data source 11 can be a desktop computer, a tablet computer, a smart phone, or a video player. The image data source 11 can transmit the image data to the transmitter 10 through the link port P1. The image data source 11 includes a power supply 11a and a central processing unit (CPU) 11b. The central processing unit 11b can transmit current power provided by the power supply 11a to the transmitter 10 through the link port P2 according to standards of the image data source 11 and the transmitter 10. For example, after the image data source 11 and the transmitter 10 are electrically coupled, the power supply 11a of the image data source 11 can provide power (5V/1 A) to the transmitter 10 through the link port P2 (i.e., the USB port). Therefore, an operating system of the transmitter 10 can be performed. The receiver 12 is linked to the transmitter 10 for receiving the image data. The display device 13 is linked to the receiver 12 for displaying the image data. Any reasonable hardware modification of the transmitter 10 can be applied to the conference system 100 with low standby power consumption of the present invention. For example, the link ports between the transmitter 10 and the image data source 11 can be USB ports or USB Type-C ports. Therefore, the image data source 11 can transmit data and power to the transmitter 10 through the USB ports or the USB Type-C ports at the same time. In the conference system 100, the processor 10b of the transmitter 10 can detect a link state between the image data source 11 and the transmitter 10 through the at least one link port (i.e., the link port P2, USB port for transmitting power). When the transmitter 10 and the image data source 11 are electrically coupled, the image data source 11 can provide power to the transmitter 10 through the link port P2. Therefore, the processor 10b can cease to use the battery 10a of the transmitter 10 and control the image data source 11 for providing power to the transmitter 10. When the transmitter 10 and the image data source 11 are separated, the image data source 11 cannot provide power to the transmitter 10 through the link port P2. Therefore, the processor 10b uses the battery 10a of the transmitter 10 for driving firmware of the transmitter 10. Here, the link state includes a power channel link state or a media transmitted data channel link state. For example, when the link port P1 is the HDMI port and the port P2 is the USB port. The link port P1 corresponds to the media transmitted data channel. The link port P2 corresponds to the power channel. In another embodiment, the transmitter 10 can only have the link port P2. The link port P2 can be the USB port. The USB port can include the media transmitted data channel and the power channel.

In other words, the transmitter 10 can include at least one link port. The at least one link port can establish the media transmitted data channel and the power channel to the image data source 11. In the conference system 100, after the image data source 11 establishes a link to the transmitter 10 through the at least one link port, the image data can be transmitted from the image data source 11 to the receiver 12 through the transmitter 10. Then, the receiver 12 can control the display device 13 for displaying the image data.

Figure 2:
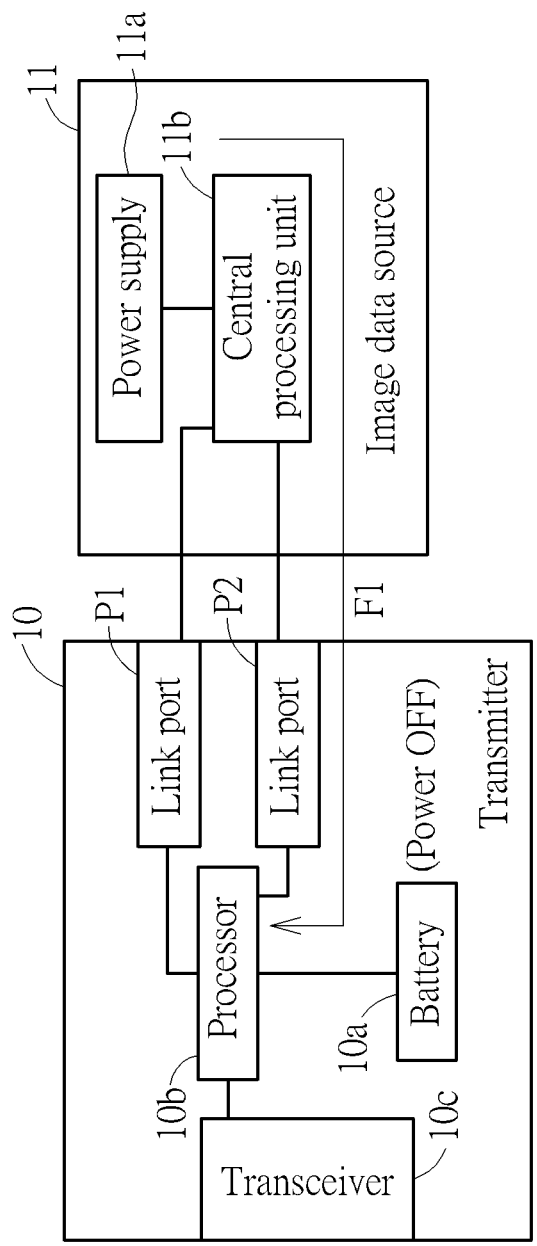
FIG. 2 is an illustration of transmitting current under a first mode of the conference system in FIG. 1.
Figure 3:
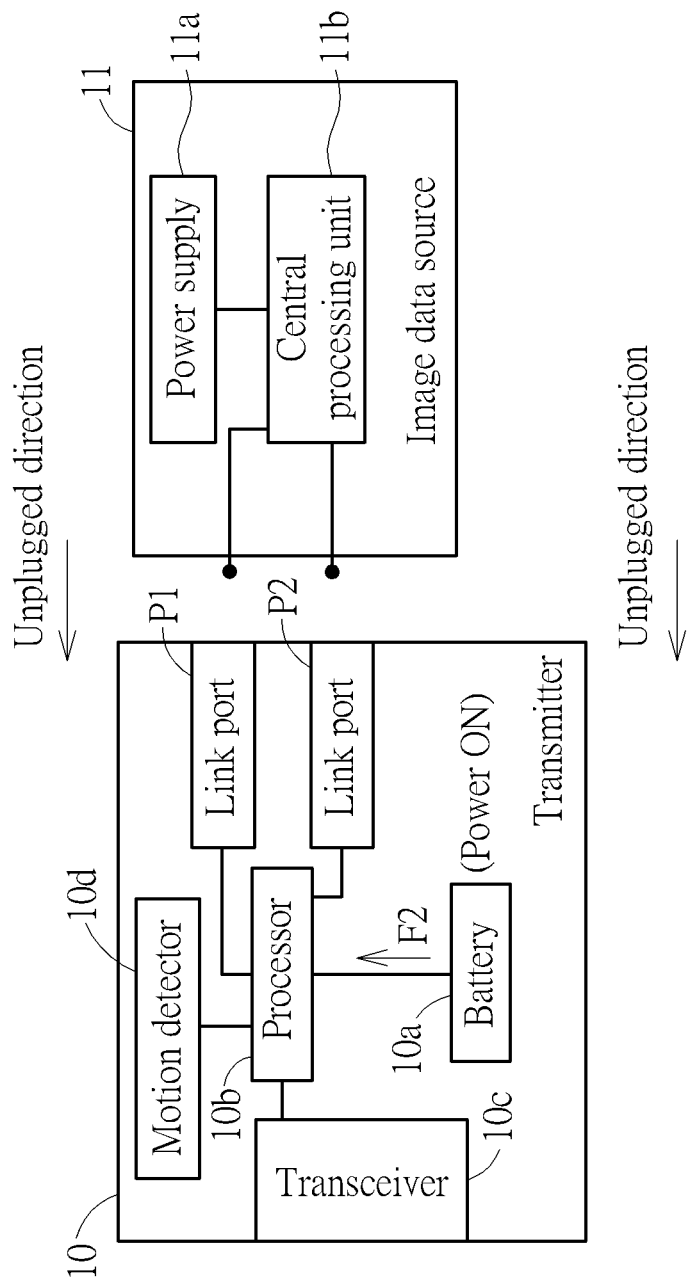
FIG. 3 is an illustration of transmitting current under a second mode of the conference system in FIG. 1.

FIG. 2 is an illustration of transmitting current under a first mode of the conference system 100. FIG. 3 is an illustration of transmitting current under a second mode of the conference system 100. In the first mode, since the processor 10b can detect that the transmitter 10 and the image data source 11 are electrically coupled through the link port P1 and the link port P2, the processor 10b can disable the battery 10a of the transmitter 10. Then, the central processing unit 11b of the image data source 11 can control the power supply 11a for generating a current (i.e., 5V/1 A USB power level). The current generated by the power supply 11a can be transmitted to the transmitter 10 along a path F1 through the link port P2. Therefore, the processor 10b can maintain operations of an operating system installed in the transmitter 10. In the second mode, since the processor 10b detects that the transmitter 10 is separated from the image data source 11, the processor 10b can enable the battery 10a of the transmitter 10. After the battery 10a is enabled, the processor 10b can execute the operating system installed in the transmitter 10 for pre-booting the transmitter 10 during a predetermined time. Here, the battery 10a can provide power to the transmitter 10 for continuously performing the operating system through the path F2 during the predetermined time (i.e., 20 seconds). In other words, after the transmitter 10 and the image data source 11 are separated, if the transmitter 10 is coupled to at least one port of another image data source during the predetermined time (i.e., 20 seconds), no interruption of executing the operating system installed in the transmitter 10 is introduced.

Further, in the conference system 100, a pre-booting function can also be introduced for reducing the startup delay time, as described below. After the transmitter 10 is separated from the image data source 11, when the processor 10b detects that the transmitter 10 is triggered by a button or by a wireless signal, the processor 10b can execute the operating system installed in the transmitter 10 for pre-booting the transmitter 10. Further, the processor 10b can maintain the operations of the operating system of the transmitter 10 by using the battery 10a. Therefore, after the transmitter 10 is linked to the image data source 11 again, the image data source 11 can directly transmit the image data to the receiver 12 through the transmitter 10 without introducing an activated delay of the operating system. Particularly, the aforementioned "trigger" event can correspond to the following embodiments. (1) The transmitter 10 can be triggered by the button or the wireless signal. Therefore, the battery 10a of the transmitter 10 can be enabled, thereby driving firmware operations of the operating system installed into the transmitter 10. (2) The transmitter 10 can include a motion detector 10d (as shown in FIG. 3). The motion detector 10d is coupled to the processor 10b. The motion detector 10d can be a gravity sensor (G-Sensor). The motion detector 10d can sense a movement track of the transmitter 10 for detecting a link state between the image data source 11 and the transmitter 10. When the movement track matches at least one predetermined movement track, the transmitter 10 can use the battery 10a for executing the operating system installed in the transmitter 10 for pre-booting the transmitter 10. For example, when the movement track of the transmitter 10 matches a predetermined movement track corresponding to a vertically rising and then falling motion→a left or right swing motion→a linear acceleration motion, the transmitter 10 may be picked up by the user from the table. Then, the user looks for the USB port. The transmitter 10 is plugged into the USB port after the transmitter 10 is aligned to the USB port. Therefore, the motion detector 10d can transmit information of the movement track of the transmitter 10 to the processor 10b. The processor 10b can determine if the transmitter 10 is pre-booted according to the information of the movement track. Further, a pre-booting process of the transmitter 10 can be reasonably modified. For example, the transmitter 10 can be pre-booted by using an internal battery 10b. The pre-booting process requires startup time. When the transmitter 10 is electrically coupled to the image data source 11 within a startup time, the processor 10b can immediately disable the battery 10b. Then, the image data source 11 can provide power to the transmitter 10. Further, when the transmitter 10 is electrically coupled to the image data source 11 within the startup time, the processor 10b can switch the image data source 11 as a power source before the battery 10b is out of power. In other words, even if the operating system of the transmitter 10 can switch the power source during the startup time, the booting process of the operating system can still be completed. Further, since the transmitter 10 can use the battery 10b for pre-booting the operating system, when the transmitter 10 is electrically connected to the image data source 11, all functions can be executed immediately, thereby increasing the operation experience. On the contrary, since no battery is introduced to the conventional transmitter, the conventional transmitter must be electrically coupled to the image data source before the booting process is started. Since the booting process requires startup time, the operation experience of the conventional transmitter may be reduced.

Further, the aforementioned "movement track" of the transmitter 10 can be any reasonable movement track. For example, the transmitter 10 may be placed in a storage box. The processor 10b can set at least one predetermined movement track that the transmitter 10 is taken out from the storage box to the image data source 11. For example, the processor 10b can set at least one predetermined movement track corresponding to a rising and then falling motion. Then, the transmitter 10 can use the battery 10a for booting the operating system installed into the transmitter 10 according to the movement track. In practice, if the storage box provides a three-dimensional storage space. The transmitter 10 is vertically disposed inside the storage box. The movement track corresponding to the transmitter 10 taken out from the storage box to the image data source 11 can include the following motions. (a) The transmitter 10 moves along in a vertical direction. (b) Then, the transmitter 10 can be rotated by 90 degrees. Specifically, if the storage box is placed horizontally by the transmitter 10, the movement track corresponding to the transmitter 10 taken out from the storage box to the image data source 11 can include the following motions. (a) The transmitter 10 moves along in a horizontal direction. (b) Then, the transmitter 10 can be rotated by 90 degrees. Further, as previously mentioned, when the movement track of the transmitter 10 corresponds to a vertically rising and then falling motion→a left or right swing motion→a linear acceleration motion, it implies that the transmitter 10 prepares to be coupled to the image data source 11. The transmitter 10 can execute the operating system and then can operate all functions before the transmitter 10 is electrically coupled to the image data source 11 according to the movement track. Therefore, the waiting time for booting the operating system can be reduced. In the conference system 100, any reasonable predetermined movement track or positioning method of the transmitter 10 falls into the scope of the present invention.

As previously mentioned, the transmitter 10 can be pre-booted before the transmitter 10 is electrically coupled to the image data source 11 for avoiding a startup time delay. Further, the processor 10b of the transmitter 10 can also detect that the transmitter 10 is to be separated from the image data source 11 according to at least one condition. Then, the processor 10b can prepare to maintain an activation state of the operating system of the transmitter 10, as illustrated below. When the transmitter 10 is electrically coupled to the image data source 11 and the transmitter 10 is triggered by a button or by a wireless signal, the processor 10b can maintain operations of an operating system installed in the transmitter 10. In other words, in this mode, before the transmitter 10 is separated from the image data source 11, the user can manually trigger the processor 10b for preparing to maintain the operations of the operating system of the transmitter 10. In practice, the transmitter 10 can be triggered by at least one physical button (i.e., pressing the physical button), at least one virtual button, or at least one wireless signal. When the transmitter 10 is triggered, the operations of the operating system can be maintained. In other words, after the transmitter 10 is separated from the image data source 11, the processor 11b still maintains the operations of the operating system installed in the transmitter 10. Alternatively, the user can use the image data source 11 for generating a notification signal to the transmitter 10 through an interface or a key displayed on the image data source 11. Therefore, operations of the operating system installed in the transmitter 10 can be maintained according to the notification signal. Therefore, when the transmitter 10 is separated from the image data source 11, the processor 10b can still use the battery 10a for maintaining the operations of the operating system during the predetermined time. Moreover, when the transmitter 10 is separated from the image data source 11 and the operating system of the transmitter 10 has been enabled during the predetermined time, the processor 10b can shut down the transmitter 10.

As previously illustrated, the transmitter 10 can include the motion detector 10d (as shown in FIG. 3). The motion detector 10d is coupled to the processor 10b. The motion detector 10d can be a gravity sensor (G-Sensor). The motion detector 10d can sense the movement track of the transmitter 10 for detecting the link state between the image data source 11 and the transmitter 10. After the transmitter 10 is electrically coupled to the image data source 11, the motion detector 10d detects a movement track of the transmitter 10. For example, when the motion detector 10d detects that the transmitter 10 wobbles between a left side and a right side, it implies that the transmitter 10 is to be unplugged from the image data source 11. Therefore, the processor 10b determines that the transmitter 10 is to be separated from the image data source 11 according to the movement track. Then, the processor 10b can maintain the operations of the operating system installed in the transmitter 11.

Figure 4:
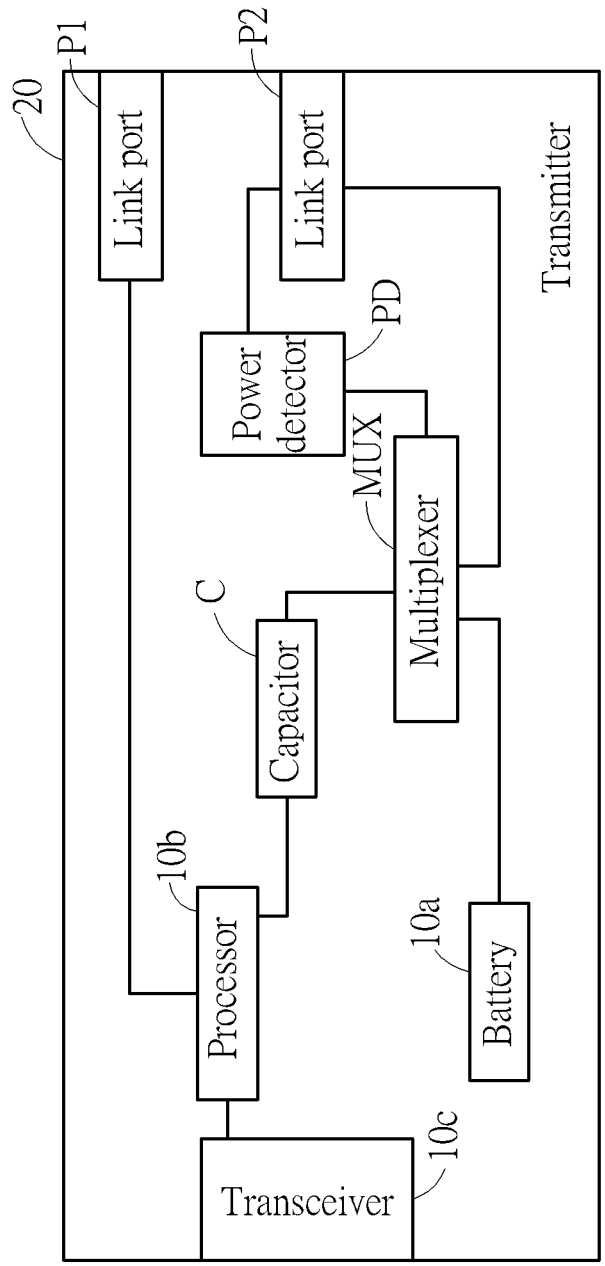
FIG. 4 is a block diagram of a transmitter of the conference system according to another embodiment of the present invention.

In another embodiment, when the transmitter 10 is separated from the image data source 11, the processor 10b of the transmitter 10 can detect a situation and then generate a notification signal accordingly. The situation can include the transmitter 10 being used for projecting images and being unplugged from the image data source 11, the receiver 12 being only linked to the transmitter 10, or determining that a meeting has not finished according to meeting agenda information. The method for detecting the situation can be performed by using a remote detector or a camera through a wireless network according to the meeting agenda information. Further, the method for detecting the situation can be performed by using a power detector PD (as shown in FIG. 4) disposed inside the transmitter 10 according to link status information. The battery 10a of the transmitter 10 can drive the firmware of the transmitter 10 according to the notification signal. Any technology modification of detecting the situation of the transmitter 10 for optionally maintaining the operations of the operating system falls into the scope of the present invention.

FIG. 4 is a block diagram of a transmitter of the conference system 100 according to another embodiment of the present invention. For avoiding ambiguity, the transmitter in FIG. 4 is called as a transmitter 20. The transmitter 20 may introduce a capacitor C, a multiplexer MUX, and a power detector PD. A structure of the transmitter 20 is shown in FIG. 4. Thus, details are omitted here. The power detector PD can be used for detecting if the link port P2 carries a current flow. If the current flow of the link port P2 is detected, it implies that the link port P2 is coupled to the image data source 11. Input terminals of the multiplexer MUX are coupled to the link port P2 and the battery 10a. A control terminal of the multiplexer MUX is coupled to the power detector PD. In other words, the multiplexer MUX can control the transmitter 20 to select a power source from the link port P2 coupled to the image data source 11, or from the battery 10a according to a detection result of the power detector PD. For example, if the power detector PD detects that the current is inputted from the link port P2, the power detector PD can control the multiplexer MUX for receiving the current through the link port P2. If the power detector PD detects that the link port P2 has no current, the power detector PD can control the multiplexer MUX for receiving the current from the battery 10a. Further, after the transmitter 20 and the image data source 11 are separated, the power will be lost immediately. In order to generate sufficient time for the processor 10b, the multiplexer MUX and the power detector PD of the transmitter 20 to control the battery 10a for providing power, the transmitter 20 can introduce a capacitor C to ensure that the processor 10b, the multiplexer MUX, and the power detector PD can be normally operated during a short time interval. The short time interval is defined as a time period where the link port P2 is separated from the image data source 11 and the battery 10a is not enabled yet. However, in other embodiments, the processor 10b, the multiplexer MUX, and the power detector PD can include tiny power storage devices for maintaining their basic driving functions.

Figure 5:
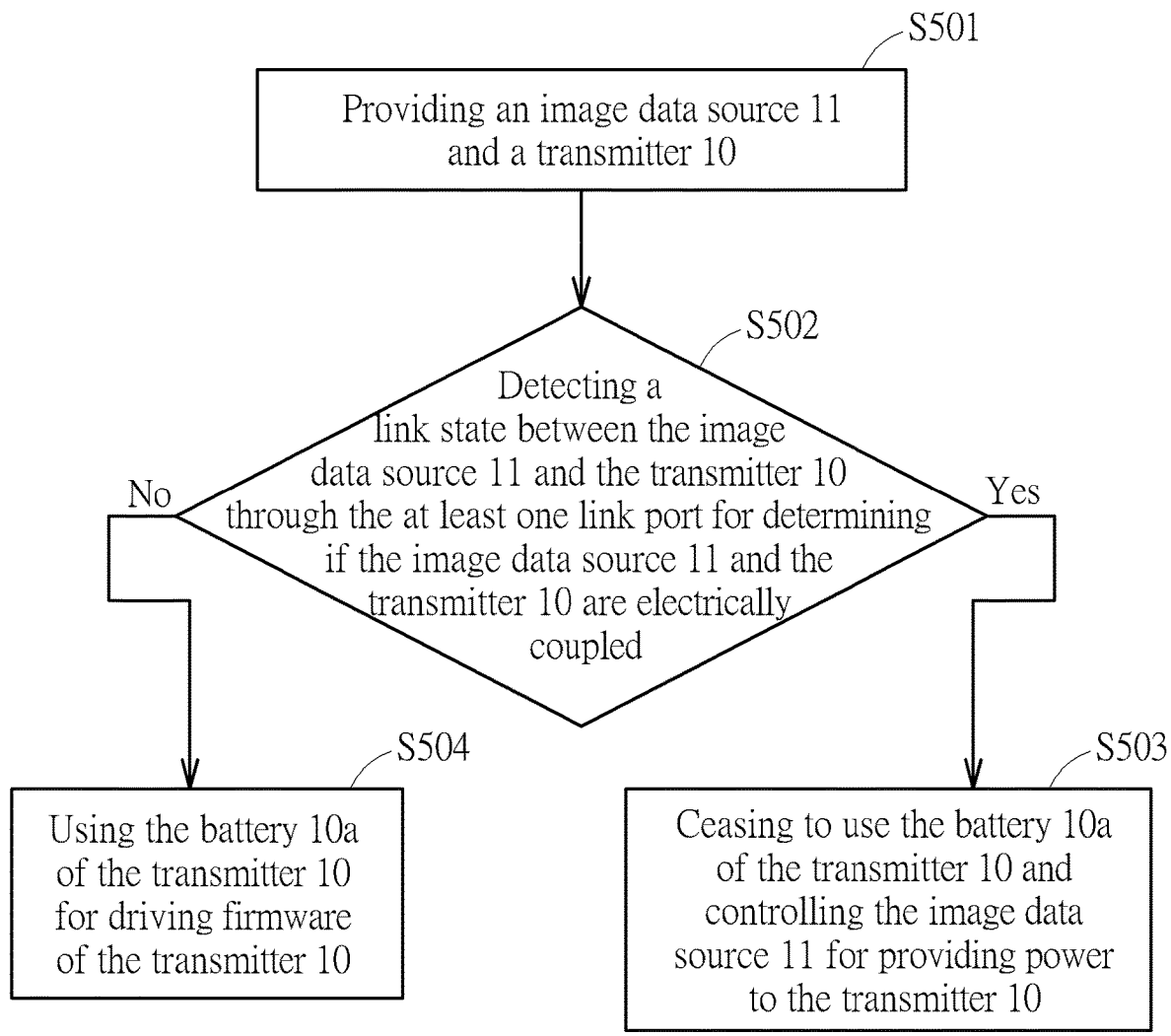
FIG. 5 is a flow chart of performing a method with low standby power consumption by the conference system in FIG. 1.

FIG. 5 is a flow chart of performing a method with low standby power consumption by the conference system 100. The method includes step S501 to step S504. Any technology modification falls into the scope of the present invention. Step S501 to step S504 are illustrated below.

step S501: providing an image data source 11 and a transmitter 10;

step S502: detecting a link state between the image data source 11 and the transmitter 10 through the at least one link port for determining if the image data source 11 and the transmitter 10 are electrically coupled, if yes, executing step S503, else, executing step S504;

step S503: ceasing to use the battery 10a of the transmitter 10 and controlling the image data source 11 for providing power to the transmitter 10.

step S504: using the battery 10a of the transmitter 10 for driving firmware of the transmitter 10.

Details of step S501 to step S504 are previously illustrated. Thus, they are omitted here. In the conference system 100, to improve user's operational experience, the transmitter 10 can dynamically select one power source from two power sources (i.e., the image data source 11 and the battery 11a) for maintaining the operations of the operating system of the transmitter 10. In other words, even if the transmitter 10 switches different image data sources, the activation of the operating system of the transmitter 10 can be maintained. Therefore, after the transmitter 10 is coupled to another image data source, the transmitter 10 can immediately execute all functions, thereby improving operational experience.

To sum up, the present invention discloses a conference system with low standby power consumption. The transmitter of the conference system can plug into different image data sources. When the transmitter is separated from one image data source and then coupled to another image data source, the battery of the transmitter is enabled for maintaining the operations of the operating system during a time. Therefore, after the transmitter is coupled to another image data source, the transmitter can immediately execute all functions, thereby improving operational experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A conference system with low standby power consumption comprising:
    a transmitter comprising:
        a battery configured to provide power;
        at least one link port configured to access data; and
        a processor coupled to the battery and the at least one link port;
    an image data source configured to transmit image data to the transmitter;
    a receiver linked to the transmitter and configured to receive the image data; and
    a display device linked to the receiver and configured to display the image data;
    wherein the processor detects a link state between the image data source and the transmitter through the at least one link port, when the transmitter and the image data source are electrically coupled, the processor ceases to use the battery of the transmitter and controls the image data source for providing power to the transmitter, when the transmitter and the image data source are separated, the processor uses the battery of the transmitter for driving firmware of the transmitter, the link state comprises a power channel link state or a media transmitted data channel link state, after the image data source establishes a link to the transmitter through the at least one link port, the image data is transmitted from the image data source to the receiver through the transmitter, the receiver controls the display device for displaying the image data.

2. The system of claim 1, wherein when the transmitter and the image data source are separated, the processor enables the battery of the transmitter, and after the battery is enabled, the processor executes an operating system (OS) installed in the transmitter for pre-booting the transmitter.

3. The system of claim 2, wherein the transmitter is triggered by a button or a wireless signal for enabling the battery of the transmitter to drive firmware operations of the transmitter.

4. The system of claim 2, wherein the transmitter further comprises:
- a motion detector coupled to the processor;
- wherein the motion detector senses a movement track of the transmitter for detecting a link state between the image data source and the transmitter, when the movement track matches at least one predetermined movement track, the transmitter uses the battery for executing an operating system installed in the transmitter for pre-booting the transmitter.

5. The system of claim 4, wherein the processor sets at least one predetermined movement track that the transmitter is taken out from a storage box to the image data source, or the processor sets at least one predetermined movement track corresponding to a rising and then falling motion.

6. The system of claim 1, wherein when the transmitter is electrically coupled to the image data source and the transmitter is triggered by a button or by a wireless signal, the processor maintains operations of an operating system installed in the transmitter, and after the transmitter is separated from the image data source, the processor still maintains the operations of the operating system installed in the transmitter.

7. The system of claim 1, wherein when the transmitter is separated from the image data source, the transmitter uses the battery for maintaining operations of an operating system installed in the transmitter during a predetermined time.

8. The system of claim 7, wherein when the transmitter is separated from the image data source and the operating system of the transmitter has been enabled during the predetermined time, the processor shuts down the transmitter.

9. The system of claim 1, wherein the transmitter further comprising:
- a motion detector coupled to the processor;
- wherein the transmitter is electrically coupled to the image data source, the motion detector detects a movement track of the transmitter, when the processor determines that the transmitter is to be separated from the image data source according to the movement track, the processor maintains operations of an operating system installed in the transmitter.

10. The system of claim 1, wherein when the transmitter is separated from the image data source, the processor of the transmitter detects a situation and generates a notification signal accordingly, and the battery of the transmitter drives the firmware of the transmitter according to the notification signal; and
- wherein the situation comprises the transmitter being used for projecting images and being unplugged from the image data source, the receiver being only linked to the transmitter, or determining that a meeting has not finished according to meeting agenda information.

11. A transmitter with low standby power consumption, the transmitter being linked to a receiver and an image data source, the transmitter comprising:
- a battery configured to provide power;
- at least one link port configured to access data between the image data source and the transmitter; and
- a processor coupled to the battery and the at least one link port;
- wherein the processor detects a link state between the image data source and the transmitter through the at least one link port, when the transmitter and the image data source are electrically coupled, the processor ceases to use the battery of the transmitter and controls the image data source for providing power to the transmitter, when the transmitter and the image data source are separated, the processor uses the battery of the transmitter for driving firmware of the transmitter, the link state comprises a power channel link state or a media transmitted data channel link state, after the image data source establishes a link to the transmitter through the at least one link port, the image data is transmitted from the image data source to the receiver through the transmitter, the receiver controls the display device for displaying the image data.

12. The transmitter of claim 11, wherein when the transmitter and the image data source are separated, the processor enables the battery of the transmitter, and after the battery is enabled, the processor executes an operating system (OS) installed in the transmitter for pre-booting the transmitter.

13. The transmitter of claim 11, wherein when the transmitter is separated from the image data source, the transmitter uses the battery for maintaining operations of an operating system installed in the transmitter during a predetermined time.

* * * * *